H. G. BUTLER.
EXCAVATOR SHOVEL.
APPLICATION FILED MAR. 14, 1910.
1,053,783.
Patented Feb. 18, 1913.
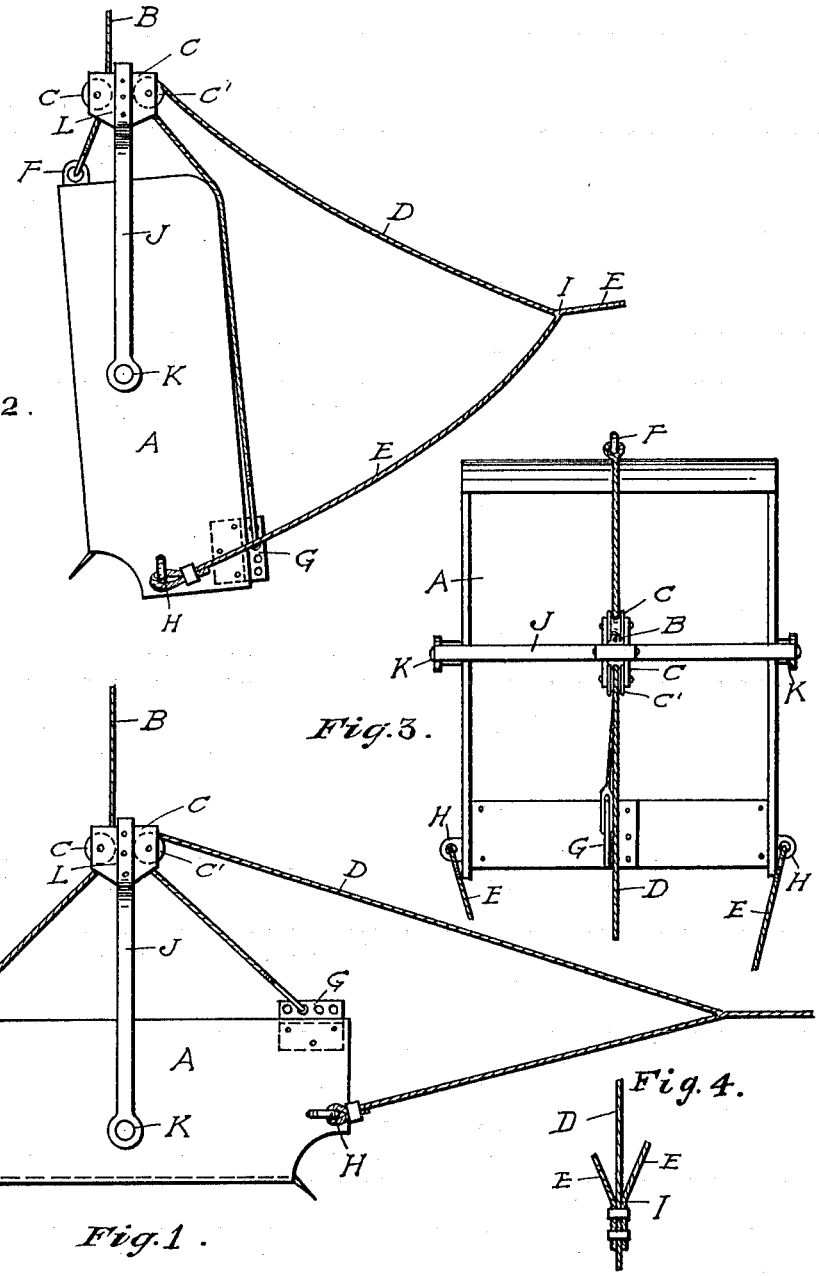
Witnesses:
A. B. Cornelius
Evangeline O. Gibbons
Inventor:
Henry G. Butler
by Eugene Ayres,
Attorney.

UNITED STATES PATENT OFFICE.

HENRY G. BUTLER, OF KENOSHA, WISCONSIN.

EXCAVATOR-SHOVEL.

1,053,783.  Specification of Letters Patent.  Patented Feb. 18, 1913.

Application filed March 14, 1910. Serial No. 549,323.

*To all whom it may concern:*

Be it known that I, HENRY G. BUTLER, a citizen of the United States, residing at Kenosha, in the county of Kenosha and State of Wisconsin, have invented certain new and useful Improvements in Excavator-Shovels, of which the following is a specification.

My invention relates to that class of excavator shovels now commonly known as drag line shovels and embodies entirely new principles in the method of dumping and controlling the same.

I accomplish my object in the manner illustrated in the accompanying drawings, in which,—

Figure 1 is a side elevation with all the controlling parts under tension; Fig. 2 is a view of Fig. 1 in the dumped position; Fig. 3 is a plan view of the same and Fig. 4 is the junction of the deflecting cable and the drag-line cable shown broken away in Fig. 3.

Similar letters refer to similar parts in the several views.

In the drawings A is a shovel and B is a hanging cable fastened at F to the rear of the shovel. In the use of the word cable it should be understood I include chains or any flexible means.

D is a deflecting cable and E a drag line cable.

J is a sheave controlling bail pivoted to the sides of the bucket at any suitable point regardless of the center of gravity of the bucket.

C is a housing attached to the top of bail J and c and c' are sheaves journaled in said housing.

G is the point at which cable D is fastened to the top of the front of the bucket and H is a similar point of attachment for the cable E at the sides of the bucket.

I represents the point of attachment for cables D and E.

K is the pivotal point of bail J, and L is a yoke holding the housing C to bail J.

The operation, as shown in Figs. 1, 2, and 3, is as follows: Tension being brought to bear on the drag line or filling cable E the bucket is drawn forward and filled and by the same tension on deflecting cable D the sheaves c and c' on the top of bail J are drawn forward of the center of gravity of the bucket. Tension is then applied to the hanging cable B and also maintained on cables D and E and the bucket raised and maintained in equilibrium until carried to the point of dumping. A release of cables D and E allows the bucket to assume dumped position, shown in Fig. 2.

It will be noticed that in all previous inventions of this class the bail forms a part of the hanging member and such hanging member of necessity had to be applied to the sides of the shovel outside the center of gravity of the shovel. In my invention it will be noted that the bail does not support the load or shovel in any manner, and its pivotal point on the shovel bears no relation to the dumping thereof. The hanging cable is the only real supporting member, and while stress is brought to bear on the deflecting sheaves and deflecting cable, they in no manner relieve the stress on the hanging cable. My object in carrying the hanging cable to the rear of the shovel is to allow the shovel to assume a vertical position in dumping and to further guard against a rear dump of the shovel in case of overweighting the rear of the shovel, as is sometimes done in shovels nearly balanced on the supporting members.

What I claim and desire to secure by Letters Patent, is:—

1. The combination with a shovel of the type described, of the body thereof and an attached deflecting bail, two sheaves housed upon the top of said bail, a hanging cable fastened to the rear of said body passed through one of said sheaves, a deflecting cable fastened near the front of said body and passed through a second sheave on said bail, its other end attached to a drag line cable.

2. The combination with a shovel of the type described, of the body thereof and an attached deflecting bail, two sheaves housed upon the top of said bail, a hanging cable fastened to the rear of said body and passed through one of said sheaves, a deflecting cable fastened near the front of said body and passed through a second sheave on said bail and a drag line cable attached near the front of the sides of said body one end of said deflecting cable fastened to said drag line cable at a distance from said body.

3. An excavator shovel having a body portion, a deflecting bail hinged thereto at any suitable point without regard to the center of gravity of said body, a plurality of sheaves housed in the top of said bail, a supporting cable fastened to the rear of said body and passed through one of said sheaves, a drag line cable fastened to the sides near the front of said body, a deflecting cable fastened near the front of said body, passed through a second of said sheaves and attached to said drag line at a distance from said body.

4. The combination with a shovel of the type described, of the body thereof, a deflecting bail pivotally attached to the sides thereof, two sheaves housed upon the top of said bail, a hanging cable fastened to the rear of said body and passed through one of said sheaves, a deflecting cable fastened near the front of said body and passed through a second sheave on said bail, and a drag line cable attached near the front of said body, one end of said deflecting cable fastened to said drag line cable at a distance from said body.

In testimony whereof I affix my signature in presence of two witnesses.

HENRY G. BUTLER.

Witnesses:
E. J. DAVY,
W. H. SCHULTE.

---

Copies of this patent may be obtained for five cents each, by addressing the "Commissioner of Patents, Washington, D. C."